June 5, 1956 — K. WILFERT — 2,749,024
ARRANGEMENT OF A BLOWER IN A PIPE LINE
Filed Nov. 14, 1951

Karl Wilfert
By: Austin, Licke, Wilhelm & Pedlor
ATTORNEYS

United States Patent Office 2,749,024
Patented June 5, 1956

2,749,024

ARRANGEMENT OF A BLOWER IN A PIPE LINE

Karl Wilfert, Stuttgart-Degerloch, Germany, assignor to Daimler-Benz Aktiengesellschaft, Stuttgart-Untertürkheim, Germany Application November 14, 1951, Serial No. 256,320

8 Claims. (Cl. 230—117)

The present invention relates to an arrangement of a blower, particularly of such a blower, which serves for heating a vehicle and which is preferably driven by an electric motor. The present invention is particularly designed for axial blowers of smaller dimensions, which, for example are in the shape of spiral gears or ventilators, and are frequently arranged in the air-heating-and-ventilating pipes of vehicles, particularly of motor vehicles, in order to secure the delivery of a certain quantity of air under all driving conditions, i. e., regardless of whether the vehicle is moving rapidly or slowly or does not more at all.

It is an object of the present invention to provide with simple means an elastic, vibration- or noise-absorbing suspension of such a blower at the wall of the conveyer pipe or conduit, which surrounds it.

It is a further object of the present invention to provide a suspension of the blower which permits a rapid installation of the blower including its driving motor in the conveyer conduit, and to enable also a subsequent installation of the blower including its driving motor into the conveyer conduit, if so desired.

It is still another object of the present invention to provide a suspension of the blower with fastening means which avoid any substantial additional air resistance within the conduit by such fastening means.

A further object of the present invention resides in the fact that the blower, or its driving motor is connected with the surrounding pipe wall by elastic means, preferably one or several substantially radially arranged arms, which consist of an elastic material, for example of rubber, and which have preferably a streamlined cross-section.

Still another additional object of the present invention is to provide a suspension of a blower in a conduit which facilitates the installation and removal of the blower and which enhances the noise and vibration absorbing effect of the suspension by the use of a conduit section of the conveyer line at the point where it surrounds the blower and driving motor, which is manufactured separately from the adjacent parts of the conduit or line, such separately manufactured conduit section being formed of a hose section made of elastic material or supported by such a hose section.

The present invention is shown in the accompanying drawing as an example of construction.

Figure 1:
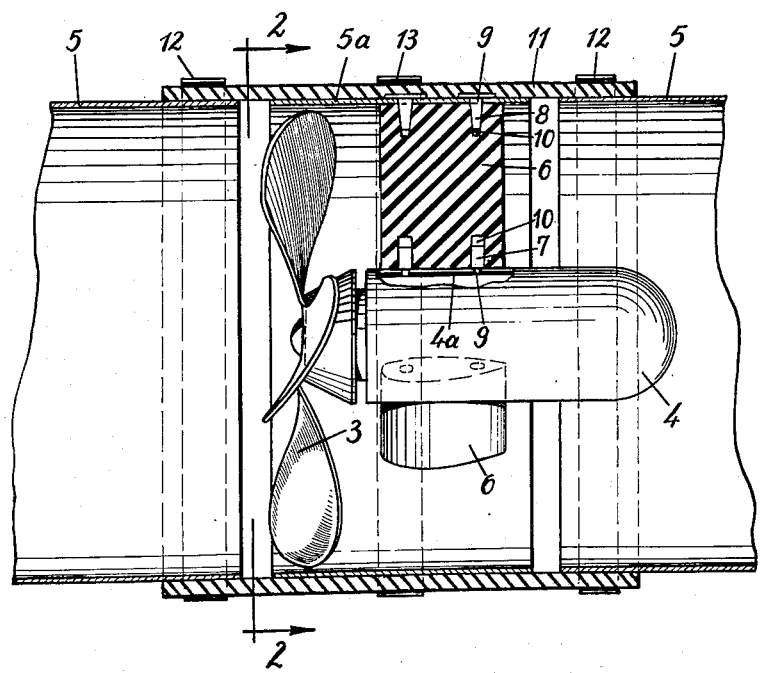
Figure 2:
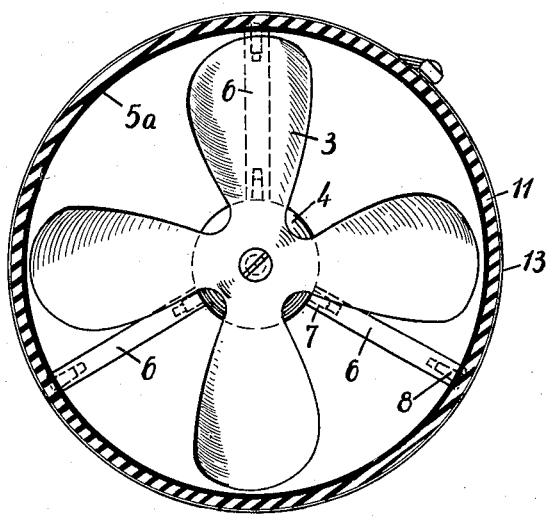

Fig. 1 shows a longitudinal section through a part of the ventilating conduit of a motor vehicle with an axial blower, which is suspended in it in accordance with the invention, and Fig. 2 shows a cross section taken on line 2—2 of Figure 1.

The impeller 3 of the blower, which is developed as a spiral gear, is arranged immediately on the shaft of its driving motor 4. In the example of construction the latter is developed as an electric motor, to which the operating current is conducted in the known manner through conducting wires, which are not shown in the drawing. The blower serves in the case on hand for the purpose of conveying a steady flow of cold or preheated fresh air for ventilating or heating the interior space of a motor vehicle. For that purpose it is axially inserted into the air conveyer pipe or conduit 5, so that the impeller 3 fills almost completely the cross section of the pipe.

In order to prevent vibrations which are created by the impeller or by its driving motor, from transferring to the pipe wall of the conveyer line and from producing a disturbing noise in the interior of the vehicle, and in order to avoid as much as possible such vibrations by attenuation immediately at the place of their origin, the driving motor is suspended elastically in the following manner at the section 5a of the conveyer pipe, which section surrounds it. Firstly the driving motor 4 is only connected by three spoke-like arranged, radial supporting arms 6 of rubber with the wall of the pipe section 5a. These supporting arms have a streamlined cross section, the main axis of which may be arranged parallel or be slightly inclined to the longitudinal center line of the blower.

In the latter case the supporting arms function simultaneously as guide vanes for the air, which is conveyed by the blower. The supporting arms are inserted with slight initial stress between the wall of the casing 4a of the driving motor and the inner wall of the pipe section 5a. They are secured against lateral displacement by cylindrical or conical pins 7 and 8, respectively which engage with their inner or outer end into suitably arranged holes 9 of the casing or pipe wall, and are inserted into appropriately shaped bores 10 of the supporting arms where the pins are retained only by frictional contact.

The vibration absorbing effect of this elastic suspension of the driving motor 4 at the pipe section 5a, which surrounds it, is in addition substantially enhanced in the example of construction by the fact that the pipe section 5a, which is manufactured separately, is again connected elastically with the adjacent parts of the air conveyer pipe or conduit 5, which is interrupted for this purpose. This elastic connection is effected by a piece of hose 11 of rubber or the like, which is slide over the point of interruption of the air conveyer pipe 5 and is clamped at its ends to the pipe 5 by hose clamps 12. An equal hose clamp 13 secures the position of the pipe section 5a within the hose 11.

If the occasion arises, the pipe section 5a can also be entirely dropped, if the supporting arms 6 are connected with the hose piece 11 by a method of gluing or by vulcanization or are manufactured in one piece with the latter as a pressed rubber part. In each case an extremely simple connection with the blower will result, which can be manufactured easily and quickly and has a strong noise-absorbing effect, whereby not only the constant surveillance and maintenance of the blower and of the driving motor is facilitated, but also the subsequent insertion of such a blower into an existing air conveyer pipe is facilitated. In the example of construction the blower drive is effected by an electric motor. But, of course, similar advantages can be achieved through this invention, if as a driving motor for the blower a pneumatically or hydraulically driven piston- or flow-engine is utilized.

If so desired, casings, body parts of the vehicle, or the like may also be used as conduits or conduit sections. As to the remainder, the present invention is susceptible of many changes and variations within the scope of the individual characteristics thereof and it is understood that they may be thus varied except as limited by the appended claims.

What I claim is:

1. In a ventilating conduit having opposed end portions for motor vehicles, a metal housing section inserted intermediate said opposed end portions of said conduit, an elastic hose connection surrounding said section and overlapping said opposed portions, means for clamping said hose to said end portions of the conduit, an impeller, drive means for said impeller, means for axially mounting said impeller and said drive means in said housing section including radially extending, prestressed resilient noise and shock absorbing supporting arms abutting directly with the inner surfaces thereof against said drive means and with the outer surfaces thereof against said housing section, and means for securing said arms to said housing section and to said drive means against lateral displacement.

2. An axial-flow ventilator suspended with the driving motor thereof in a ventilating conduit of a vehicle, particularly of a motor vehicle, comprising an impeller, means for driving said impeller, a plurality of elastic, noise-absorbing arms directly abutting with the inner surfaces thereof against said driving means and with the outer surfaces thereof against the walls of a portion of said ventilating conduit, said arms being pre-stressed during emplacement thereof between said driving means and said conduit portion to provide adequate radial support of said driving means in said conduit portion, and means for preventing relative axial movement between said arms and said conduit portion and driving means.

3. The combination according to claim 2, wherein said arms are formed of soft rubber having a stream-lined cross section.

4. The combination according to claim 2, wherein said arms are provided with recesses, and said last-mentioned means includes securing pins protruding from the walls of said conduit portion and from said driving means in the direction of said arms and frictionally extending into said recesses.

5. The combination according to claim 4, wherein said conduit portion is substantially rigid and comprises a conduit section of elastic material into which said conduit portion is inserted.

6. The combination according to claim 2, wherein said arms are of such dimension as to be pre-stressed upon insertion thereof between said conduit portion and said driving means.

7. An axial-flow blower suspended with the driving motor thereof in a ventilating conduit of a vehicle, comprising three conduit sections, noise absorbing means for securing the middle section of said three sections to the adjacent end sections thereof, an axial blower, means for driving said blower, a plurality of elastic noise absorbing arms directly abutting with the inner surfaces thereof against said driving means and with the outer surfaces thereof against said middle section, said arms being pre-stressed during emplacement thereof between said driving means and said middle section to provide adequate radial support of said driving means in said middle section, and means for preventing relative axial movement between said arms and said middle section and driving means.

8. An axial-flow ventilator suspended with the driving means thereof in a ventilation conduit of a vehicle, comprising blower means, means connected with said blower for driving the latter, noise absorbing means including only a plurality of elastic pre-stressed arms for radially suspending said driving means in said conduit, and means frictionally engaging said noise absorbing means for preventing axial movement thereof relative to said driving means and said conduit.

References Cited in the file of this patent

UNITED STATES PATENTS

| | | |
|---|---|---|
| 1,491,736 | Polk | Apr. 22, 1924 |
| 1,600,522 | Strehlke | Sept. 21, 1926 |
| 1,628,302 | Bray | May 10, 1927 |
| 1,832,368 | Ell | Nov. 17, 1931 |
| 1,903,855 | Townsend | Apr. 18, 1933 |
| 2,001,573 | Haushalter | May 14, 1935 |
| 2,030,565 | Bilde | Feb. 11, 1936 |
| 2,099,566 | Lang | Nov. 16, 1937 |
| 2,236,265 | Hansson et al. | Mar. 25, 1941 |
| 2,309,583 | Frantz | Jan. 26, 1943 |
| 2,427,032 | Troller et al. | Sept. 9, 1947 |
| 2,485,408 | Pezzillo | Oct. 18, 1949 |
| 2,583,374 | Hoffman | Jan. 22, 1952 |

FOREIGN PATENTS

| | | |
|---|---|---|
| 573,979 | France | Mar. 21, 1924 |
| 717,646 | Germany | Feb. 19, 1942 |